US011847437B2

(12) United States Patent
Nordqvist et al.

(10) Patent No.: US 11,847,437 B2
(45) Date of Patent: *Dec. 19, 2023

(54) PERFORMING TRANSLATIONS ON CHANGE REQUESTS

(71) Applicant: DOORDASH, INC., San Francisco, CA (US)

(72) Inventors: Jaen Mikael Nordqvist, Cupertino, CA (US); Venkataramanan Kuppuswamy, San Jose, CA (US); Hang Yin, Mountain View, CA (US)

(73) Assignee: DOORDASH, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,333

(22) Filed: May 31, 2022

(65) Prior Publication Data

US 2022/0291909 A1 Sep. 15, 2022

Related U.S. Application Data

(63) Continuation of application No. 17/123,177, filed on Dec. 16, 2020, now Pat. No. 11,354,102.

(51) Int. Cl.
*G06F 8/51* (2018.01)
*G06F 8/71* (2018.01)
*G06F 16/23* (2019.01)

(52) U.S. Cl.
CPC .............. *G06F 8/51* (2013.01); *G06F 8/71* (2013.01); *G06F 16/2358* (2019.01)

(58) Field of Classification Search
CPC ........... G06F 8/51; G06F 16/2358; G06F 8/71
USPC ........................................................ 717/122
See application file for complete search history.

(56) References Cited

U.S. PATENT DOCUMENTS 11,354,102 B1 * 6/2022 Nordqvist ........... G06F 16/2358
2016/0350108 A1 12/2016 Joo \* cited by examiner

*Primary Examiner* — John Q Chavis
(74) *Attorney, Agent, or Firm* — Mattingly & Malur, PC

(57) ABSTRACT

In some examples, one or more processors configured by executable instructions receive, from a first computing device, at least one key-to-string mapping related to updated software located at a repository. The one or more processors further receive an indication of a target locale associated with the updated software. The one or more processors may compare a first string from the at least one key-to-string mapping with translated strings maintained in a database in association with the target locale to determine that a translated version of the first string for the target locale is present in the database. The one or more processors may send the translated version of the first string from the database to the first computing device in association with the updated software located at the repository.

20 Claims, 6 Drawing Sheets

PERFORMING TRANSLATIONS ON CHANGE REQUESTS

CROSS-REFERENCE TO RELATED APPLICATION

This application is a continuation of, and claims priority to, U.S. patent application Ser. No. 17/123,177, filed Dec. 16, 2020, issued as U.S. Pat. No. 11,354,102, and which is incorporated by reference herein.

BACKGROUND

Most software used in multiple different countries is expected to be able to communicate with a user in the local language and local units (e.g., units of measurement, units of currency, etc.). Accordingly, translation of software is typically performed to enable use of the software in various different locales. Conventional approaches for providing translated software include separating the textual content to be translated from the software and organizing the textual content according to key values. Separate key values translated into the corresponding local language and units may be generated for each target locale. The software may use "keys" to lookup the translated text for a target locale and insert the corresponding values into the software in place of the original text. In some cases, the set of values to be inserted into the software for corresponding keys may be determined based on the locale settings on the user's device. While the key-value approach provides a satisfactory outcome, translating all the different text values from their source language and units into all the desired target languages and units can involve a substantial amount of manual labor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
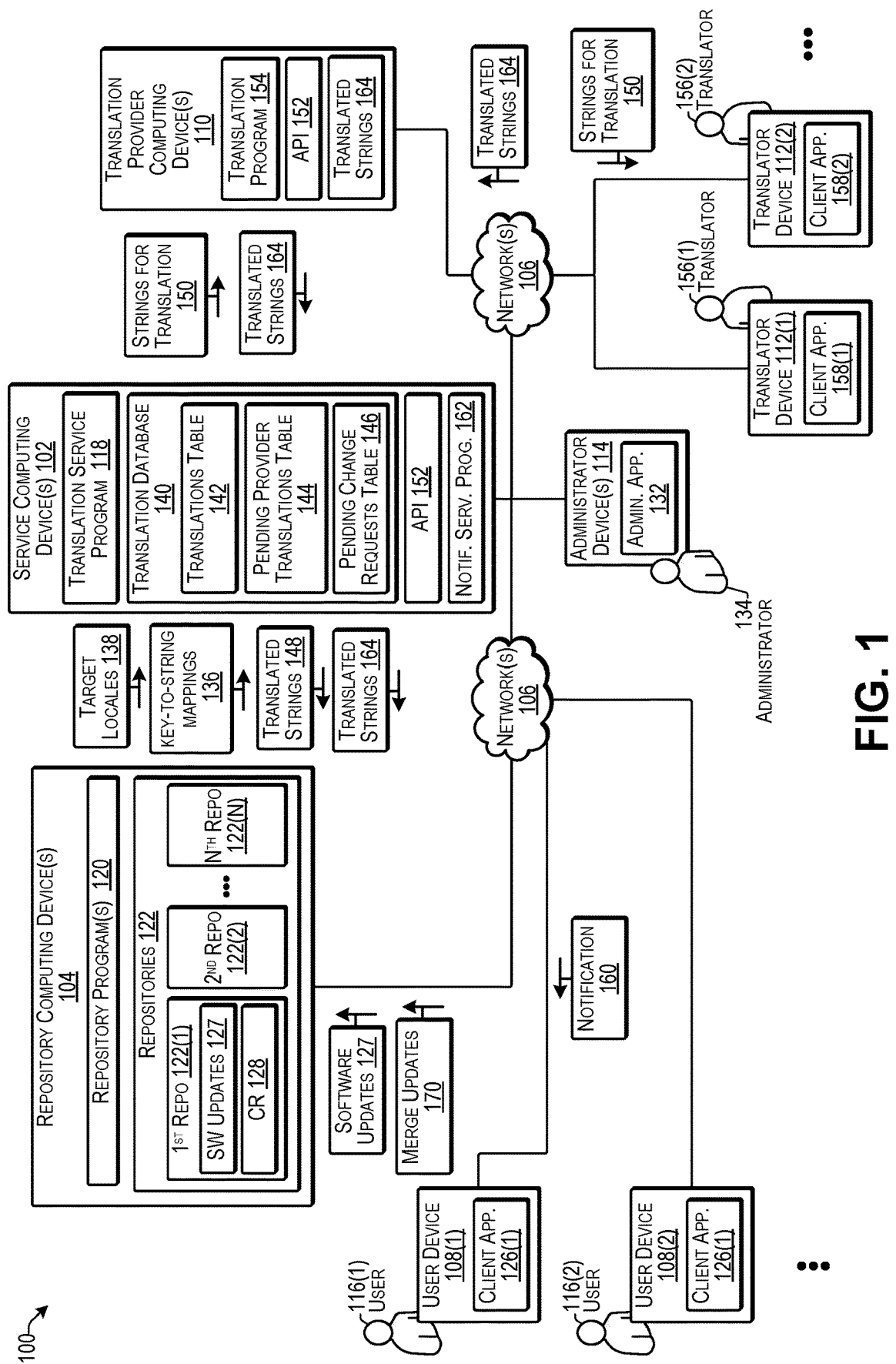
FIG. 1 illustrates an example architecture of a distributed computing system able to process translations according to some implementations.

Some implementations herein are directed to techniques and arrangements for minimizing the manual labor associated with software translations. Some examples may be employed for performing translation for various types of software, which may include applications, such as mobile applications, application user interfaces, as well as other parts and types of software programs, software packages, software platforms, system software, backend software, drivers, and so forth, that may be used in multiple different countries.

In some cases, the techniques herein may be utilized with an online repository that includes a version control system for enabling online software collaboration. For instance, when an update is made to software, a change request (also referred to as a "pull request" in some examples) may be created on the repository for enabling other authorized users to review changed code or other software updates to determine whether the software updates should be approved and merged into an existing master code for the software to thereby update the software. Examples of online repositories may include GITHUB, GITLAB, BITBUCKET, SOURCE-FORGE, and the like. In addition, the online repository may support version control and issue tracking aspects of software development. For version control, the online repository may allow change requests to be created to propose changes to the source code of a particular software version, such as for generating a newer version.

Users authorized to review the proposed changes for a change request may be able to view the requested changes, view a summary of the requested changes, and/or view a difference between the requested changes and the original software. Furthermore, the authorized users may be able to approve the changes, comment on the changes, reject the changes, or the like. As one example, when the requested changes are approved, this may be referred to as "committing" the requested changes. A history of all commits may be maintained and viewed by authorized users, such as at a later time.

Furthermore, implementations herein may include one or more translation service computing devices that are able to communicate with one or more translation provider computing devices. In some cases, the translation provider computing device may provide a machine interface to enable translation requests to be automatically requested and performed, such as via an application programming interface (API). The translation requests may be processed by the translation provider computing device, either via machine translation or by forwarding to human translators at translator devices. The translated strings may be returned to the translation service computing device, such as via the API, without manual intervention from the developers or other humans. The translated strings may be received by the translation service computing device and uploaded to the repository for association with the corresponding change request.

The system herein employs a configuration that automatically determines source content for translation. The system also includes a version control function that notifies the translation service computing device whenever a new change request is submitted and/or when changes are being made to a change request in one of the configured locations. Upon notification of a change request, the translation service computing device may automatically read, verify, and identify any new strings, altered strings and/or deleted strings in the updated code, and may provide an indication to the respective developer, via the repository, as to whether the proposed changes associated with the change request are accepted or rejected. The translation service computing device may also identify any strings in the updated code associated with the change request that require translation to one or more target locales. For instance, a localization file that identifies target locales may be associated with the change request.

Once the developer has verified the results of the initial checking of the change request sent by the translation service computing device to the repository, the developer may input a command, e.g., "translate apply", to the repository for the change request to confirm that the translation service computing device should proceed with acquiring the translations for the strings that require translation. At this point the translation service computing device may check its own database to determine whether any of the strings have already been translated previously. Further, the translation service computing device may pass any strings that have not already been translated to the translation provider computing device along with the source locale of the strings (e.g., US English) and the set of locales to which the respective strings are desired to be translated.

For every translation completed, the translation service computing device may automatically upload the resulting strings to the change request, to a corresponding target locale file in the proper format, along with a progress status. After the translated strings for the target locales have been uploaded to the change request and checked by the developer, the developer may simply merge the change request to the master code of the repository. This may result in the translated strings for the target locales being available for deployment to the software for selected locales. As one example, in the case of an application on a mobile device, when a user switches a locale setting on the mobile device, the mobile device may switch from a localization file for the prior locale to a different localization file for the selected locale. The localization file for a particular locale contains the translated strings for the particular locale. The application is then able to access the key-value translated strings for the selected locale to enable the application to present its user interface and other text associated with the application in the translated language of the selected locale.

The system herein may utilize a pluggable model to allow for arbitrary language file formats. For instance, enabled formats may include mobile device file formats for ANDROID and IOS, as well as a JSON format suitable for generic computerized reading and other formats, such as those used by legacy backend software, or the like. The core of the system may be completely agnostic to both file formats and translation providers. Accordingly, arbitrary translation providers may be employed by simply implementing an adapter, API, or the like, that handles the specifics of the translation provider.

The system herein further includes a feature referred to as "namespaces" that allows automatic sharing and distribution of the translated strings across multiple source locations and multiple different platforms or operating systems. For example, the translated strings herein may be shared between different applications or different versions of applications, and are not restricted to use with particular keys for particular applications. For example, in the case of a mobile device application implemented for both IOS and ANDROID, where all or a majority of the translated texts are the same between the two versions, a single set of translated strings may be shared between the two different versions of the application, and individual strings may be associated with different keys for the respective different applications. Each localization content location is determined by a configuration file, which among other things specifies the repository location (URL), the location of files in the given repository, the set of locales and a namespace. By associating two or more localization content locations (e.g., localization files) with the same namespace, the content of the locations are shared. That means that localization changes in one of the locations may be automatically propagated to all other localization content locations (e.g., other localization files) sharing the same namespace. As an example, it is common that companies provide different versions of an application for ANDROID and IOS, but since the actual software code as well as the localization file format for the two different versions of the application are entirely different, the localization content may reside in two separate locations. It may still be very likely, however, that most of the actual localization content between the two versions of the application is identical, and by sharing a namespace between the two localization files for the two different versions of the application, a developer only has to make changes in one of the locations and the changes can be propagated to the other location.

Further, the implementations herein may require only minimal interactions on the part of a developer. For instance, a developer may simply provide the target locales and enter a command, such as "translate apply" for a change request, and, in response, may receive translations on the portions of the change request that need to be translated. Thus, the system herein reduces the chances of human error in the process of associating translations for a plurality of different locales with code updates in change requests. Further, the system allows for change requests to be tested for localization and prevents change requests from being merged without translations. In addition, the system provides for easy-to-add localization file formats and is easy to integrate with various different translation providers without any impact to the developers.

In addition, the system may determine file differences, content distribution amongst namespaces, and may perform processing with respect to data relations and set operations. As one example, the translation service herein may normalize localization content into a common form independent of the particular format of the source file, and may use this normalized format to determine the differences between the new and the old content. For instance, suppose that the original source string is "enter credit card". The string may be stored as text with various types of markups depending on the format of the file to which the string corresponds, but the text itself may be normalized (e.g., plain text, such as ASCII, .txt, etc.) able to be compared with other normalized text to determine whether strings in the change request are new strings that need to be translated or old strings for which translations already exist.

As one example of the normalization herein, ANDROID language files may employ an XML-based format, whereas IOS language files may employ plain key-value pairs, and other types of software may use JSON formatted files, and so forth. Further, there may be some types of content that differ between formats. As one example, non-printing characters, such as escape characters, control characters, etc., may differ for different types of software. For instance, a "\n" may be a literal sequence that may be used to represent a "new line" and may therefore have special meaning to the reading software. Thus, these types of character sequences may be escaped in the text of a normalized string, e.g., the escape character indicates that the following character(s) has a special meaning. As another example, placeholder characters may typically be platform-specific markers that indicate a location in a string at which software will add a value at an appropriate time. For instance, in the string "Hello {name}, your food from {restaurant} is on the way!", the placeholders are "{name}" and "{restaurant}", which will be replaced with the actual name of the user and the actual name of the restaurant when the message is generated by the respective software. Placeholders may differ for different software platforms and may look like the examples above, or may be substantially different, such as "% is". The normalized format used in the examples herein may store these constructs in a form that is commonly usable by the multiple different software platforms, which can simplify the process of adding a new format, such as for an additional type of software. For instance, maintaining the translated strings in a normalized state eliminates the need for implementing converters between all the various different software formats, so that each format may only require conversion to and from the normalized form.

The outcome of the comparison of the normalized strings may be a set of additions, deletions, and changes, which may then be used to determine the translations to request. These changes may also be propagated to the source locale file of all other members of the namespace, and returned translations may be applied to all members of the namespace.

For discussion purposes, some example implementations are described in the environment of one or more service computing devices in communication with one or more other computing devices, such as for completing change requests with translations for multiple locales. However, implementations herein are not limited to the particular examples provided, and may be extended to other types of computing system architectures, other types of computing environments, other types of client configurations, other types of software, and so forth, as will be apparent to those of skill in the art in light of the disclosure herein.

FIG. 1 illustrates an example architecture of a distributed computing system 100 able to process translations according to some implementations. In some cases, the distributed computing system 100 may be configured for automatically obtaining and integrating a plurality of translations on strings in software, such as for translating the strings into a plurality of different languages and units for a respective plurality of target locales. In the example of FIG. 1, the distributed computing system 100 includes one or more service computing devices 102 that may communicate with one or more repository computing devices 104 over one or more networks 106. In addition, the service computing device(s) 102 and the repository computing devices 104 may communicate with one or more user devices 108, such as user devices 108(1), 108(2), . . . . Furthermore, at least the service computing device(s) 102 may communicate over the one or more networks 106 with one or more translation provider computing devices 110. Additionally, at least the translation provider computing device(s) 110 may communicate over the one or more networks 106 with one or more translator devices 112, such as translator devices 112(1), 112(2), . . . . In addition, at least the service computing device(s) 102 may communicate with one or more administrator computing devices 114, such as over the one or more networks 106, via a direct connection, or the like.

The one or more networks 106 may include any appropriate network, including a wide area network (WAN), such as the Internet; a local area network (LAN), such as an intranet; a wireless network, such as a cellular network; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the service computing device(s) 102, the repository service computing device(s) 104, the user device(s) 108, the translation provider computing device(s) 110, the translator device(s) 112, and the administrator device(s) 114 are able to communicate over the one or more networks 106 using wired or wireless connections, and combinations thereof.

In some examples, the service computing device(s) 102 may include one or more servers that may be embodied in any number of ways. For instance, the programs, other functional components, and at least a portion of data storage of the service computing device(s) 102 may be implemented on at least one server, such as in a cluster of servers, a server farm, a data center, a cloud-hosted computing service, and so forth, although other computer architectures may additionally or alternatively be used. Additional details of the service computing device(s) 102 are discussed below with respect to FIG. 6.

The service computing devices 102 may be configured to provide services to users 116, such as a first user 116(1) associated with the first user device 108(1), a second user 116(2) associated with the second user device 108(2), and so forth. For instance, the service computing device(s) 102 may execute a translation service program 118 that may be executed to cause the service computing device(s) 102 to perform various functions for obtaining, managing, and providing translated software portions (strings) for use in software generated by the users 116. The service computing device(s) 102 may also perform various other functions, as discussed additionally herein.

The repository computing device(s) 104 may include one or more servers that may be embodied in any number of ways. For instance, the programs, other functional components, and at least a portion of data storage of the repository computing device(s) 104 may be implemented on at least one server, such as in a cluster of servers, a server farm, a data center, a cloud-hosted computing service, and so forth, although other computer architectures may additionally or alternatively be used. The repository computing device(s) 104 may execute one or more repository programs 120 for providing a plurality of repositories 122, such as a first repository 122(1), a second repository 122(2), . . . an Nth repository 122(N). As mentioned above, the repositories 122 may be used by the users for receiving software updates, data, data structures, and other collaborative projects, for enabling access of other authorized users and programs to the contents of the repository 122.

In some examples, the system 100 may include the one or more administrator devices 114 able to send administrative instructions to the service computing device(s) 102, such as over the one or more networks 106 or through any other suitable connection type. For instance, each administrator device 114 may include a respective instance of an administrator application 132 that may execute on the administrator device 114, such as for communicating with a translation service program 118 for controlling settings, functions, and other aspects of the translation service program 118. For instance, an administrator 134 may use the administrator application 132 for sending management instructions for managing the service computing device(s) 102 and/or the translation service program 118. In some cases, the administrator application 132 may include a browser or may operate through a browser, while in other cases, the administrator application 132 may include any other type of application having communication functionality enabling communication with the service computing device(s) 102.

Each user device 108 may be any suitable type of computing device such as a desktop, laptop, workstation, server, tablet computing device, mobile device, smart phone, wearable device, terminal, and/or any other type of computing device able to send and receive data over a network. Users 116 may be associated with the user devices 108 such as through a respective user account, user login credentials, or the like. Furthermore, the user devices 108 may be able to communicate with the service computing device(s) 102 and the repository computing device(s) 104 through the one or more networks 106, through separate networks, or through any other suitable type of communication connection.

Further, each user device 108 may include a respective instance of a client application 126 that may execute on the user device 108, such as, client application 126(1), 126(2), ..., which may be configured for communicating with the repository program(s) 120 executable on the repository computing device(s) 104. In some cases, the application 126 may include a browser or may operate through a browser, while in other cases, the application 126 may include any other type of application having communication functionality enabling communication with the repository computing device(s) 104 and/or the service computing devices 102 over the one or more networks 106.

In this example, suppose that the first user 116(1) causes the user device 108 to execute the client application 126 to upload software updates 127 to one of the repositories 122, e.g., the first repository 122(1) in this example. Further, suppose that the first user 116(1) makes one or more inputs to the user device 108(1) to create a change request (CR) 128 in the first repository 122(1) that received the software updates 127. For example, the change request 128 may enable other users 116 and programs (e.g., the translation service program 118) to review, test, respond to, and collaborate on the software updates 127 in the first repository 122(1).

The service computing device(s) 102 may execute the translation service program 118, which may perform some of the functions discussed herein, such as with respect to FIGS. 2-5. For example, the translation service program 118 may retrieve any key-to-string mappings (key upserts) 136 in the software (code) updates 127 in the first repository 122(1) that may require translation. Further, the translation service program 118 may retrieve the target locales 138 to which any strings are specified to be translated.

When determining which strings may require translation by the translation provider computing device 110, the translation service program 118 may first check a translation database 140 to determine whether a translated version of a string for a particular target locale is already present in the translation database 140. For example, the translation database 140 may be managed or otherwise maintained by a database module of the translation service program 118 or by another suitable database management program (not shown in FIG. 1). The translation database 140 may store various types of information used by or received by the translation service program 118, which may include outstanding change requests and associated information, outstanding translation requests that have been submitted to the translation provider computing device 110, and translated strings that have been received from the translation provider computing device 110.

The translations database 140 may include one or more tables, such as a translations table 142, a pending provider translations table 144, and a pending change requests table 146. For example, the translations table 142 may include all the translated strings along with the target locale, corresponding source text, context, and the name of the provider who provided the translated string. The translations table 140 may include all the translations that have been successfully processed for some or all prior change requests. The translations table 142 is not required to include information about the particular change requests where the translated strings were used, and thus, the translated strings in the translations table 142 may be matched and used with multiple different change requests for various different applications, software packages and so forth.

The pending provider translations table 144 may include information for translations that are currently in the process of being obtained from the translation provider computing device 110. As one example, the pending provider translations table 144 may include information for each requested translation, such as a context, source text, source locale, a string identifier (string ID) and a status. For instance, the context may indicate the context of the source text, e.g., in the case of a homograph, such as "bat", the context may indicate whether the source text refers to a flying mammal or a piece of sports equipment. The context information may include any suitable type of information, such as one or more words indicative of context, text or other information preceding or following the string, a context indicator, such as an indicator of a portion of user interface to which string pertains, and so forth. In addition, the string ID may be received from the translation provider computing device 110 when the request for translation is submitted and may be subsequently used for retrieving the translated string from the translation provider computing device 110. Accordingly, the pending provider translations table 144 may include the status of all the pending translation jobs and corresponding string IDs that are pending with the translation provider computing device 110.

The pending change requests table 146 may include information for the change requests for which translations are currently being obtained. Examples of information included in the pending change requests table 146 may include a key (i.e., as part of a key upsert or key-string mapping), context, source text, source locale, target locale, change request information, and status. For example, the change request information may include repository information to enable the translation service program 118 to provide the translated strings to the correct repository and change request. Further, the pending change requests table 146 includes information about all the keys of all the change requests that currently require translations along with their source text and context.

In some examples, the translation database 140 may be a relational database; however, implementations herein are not limited to any particular database type or any particular type of data structure for the translation database 140. Further, while three tables 142, 144 and 146 are illustrated in this example for discussion purposes, in other examples, more or fewer tables may be used and or tables may be combined or divided. In addition, while the data structures are described as "tables" for convenience, other suitable types of data structures will be apparent to those of skill in the art, and implementations herein are not limited to tables per se.

As mentioned above, when the translation service program 118 receives the key-to-string mappings 136 and the target locales 138, the translation service program 118 may first check the translations table 142 to determine which strings have already been translated in the past and are maintained in the translations table 142. These translated strings 148 may be retrieved from the translations database 140 and returned to the first repository 122(1) corresponding to the change request 128. In some examples, the translation service program 118 may associate the translated strings 148 with their respective keys and may send the translated strings 148 as a commit to a feature branch of the change request 128, as discussed additionally below.

In the case of new strings that have not yet been translated by the system, the translation service program 118 may send these strings for translation 150 to the translation provider computing device(s) 110, along with an indication of context and one or more target locales. In some examples, the strings for translation may be sent via an API 152, such as a REST API, or the like. One example of a translation provider is SMARTLING of New York, NY, although implementations herein may be used with a variety of translation provider services.

The translation provider computing device(s) 110 may execute a translation program 154 for translating the received strings. In some examples, the translation provider computing device(s) 110 may perform machine translation of the received strings. In other examples, or for more complex string translation, the translation provider computing device(s) 110 may send the strings for translation 150 to the one or more translator devices 112 for translation by human translators 156, such as translator 156(1) associated with the first translator device 112(1), a second translator 156(2) associated with a second translator device 112(2), and so forth. For example, each translator device 112 may execute a respective client application 158, e.g., 158(1) and 158(2), such as a browser or other communication application, to enable communication with the translation provider computing device(s) 110.

Should a particular translator have a question about a translation, the translator may send a notification 160 to the user that originated the string being translated. For example, the notification 160 may be sent from the translator device 112, to the translation provider computing device(s) 110, which forwards the notification via the API 152 to a notification service program 162 executing on the service computing device(s) 102. The notification service program 177 may access the pending change requests table 146 to determine the change request 128 and associated user 116 to which the notification applies, and may forward the notification to the user device 108 of the identified user 116.

As one example, suppose that the first user 116(1) receives the notification 160 indicating a lack of clarity in a string in the software updates 127. in response to receiving the notification 160, the first user 116(1) may revise the software updates 127 based on the notification 160. The translation service program 118 may then receive, from the repository computing device 104, a notification of a change in the repository 122(1). The translation service program 118 may then retrieve the revised key-to-string mapping, and resubmit the revised string to the translation provider computing device(s) 110.

The translation provider computing device(s) 110 may receive translated strings 164 from the translator device 112, and or may use artificial intelligence to generate translated strings 164. The translation provider computing device(s) 110 may store the translated strings 164 and may provide the translated strings 164 to the service computing device(s) 102. As one example, as discussed additionally below, the translation service program 118 may periodically execute a scheduled job for retrieving the translated strings 164 from the translation provider computing device(s) 110, although various other techniques will be apparent to those of skill in the art having the benefit of the disclosure herein.

The translation service program 118 may receive the translated strings 164 from the translation provider computing device(s) 110. The translation service program 118 may send the translated strings and key associations to the first repository 122(1) for association with the CR 128 and the SW updates 127. In some examples, the translation service program 118 may associate the translated strings 164 with their respective keys and may send the translated strings 164 as a commit to a feature branch of the change request 128, as discussed additionally below.

The user 116(1) may be notified by the repository computing device 104 of a change to the repository 122(1), and may view or otherwise access the repository to check the translated strings. In some examples, considerable testing of the software updates 127 with the translated strings may be performed at the respective target locales before merging the software updates 127 with a master version of the software. After making sure that all translations are available in the change request in the repository 122(1), and after completion of any testing, the first user 116(1) may send a merge updates instruction 170 that merges the software updates 127 in the change request with the master version of the software. In some examples, the user 116(1) may first have to resolve any merge conflicts and both the source code language and the target locales before merging the change request, as, during the translation process, other developers may have merged other change requests independently of the change request 128.

In some examples, the system and techniques herein may be used for developing mobile content for ANDROID and IOS as well as being used for various other types of software. For instance, the techniques and system may also be used for web content development, document translation for marketing, messaging, such as email, SMS and push notifications. Further, the techniques and system may be used for backend services that generate end user visible textual content, as well as various other software programs, platforms, and the like, as discussed elsewhere herein. Additionally, implementations herein are not limited to any particular architecture or configuration for the system 100, and any of various other systems, architectures, frameworks, and arrangements may be employed in some examples, as will be apparent to those of skill in the art having the benefit of the disclosure herein.

FIGS. 2-5 set forth a sequence diagram illustrating an example process 200 for performing software translations on change requests according to some implementations. The process 200 is illustrated as a sequence of operations, some or all of which may be implemented in hardware, software or a combination thereof. In the context of software, the operations may represent computer-executable instructions stored on one or more computer-readable media that, when executed by one or more processors, program the processors to perform the recited operations. The order in which the operations are described should not be construed as a limitation. For example, some operations may be performed in a different order and/or in parallel to implement the process, or alternative processes, and not all of the operations need to be executed. For discussion purposes, the process 200 is described with reference to the environments, frameworks, and systems described in the examples herein, although the process 200 may be implemented in a wide variety of other environments, frameworks, and systems.

Figure 2:
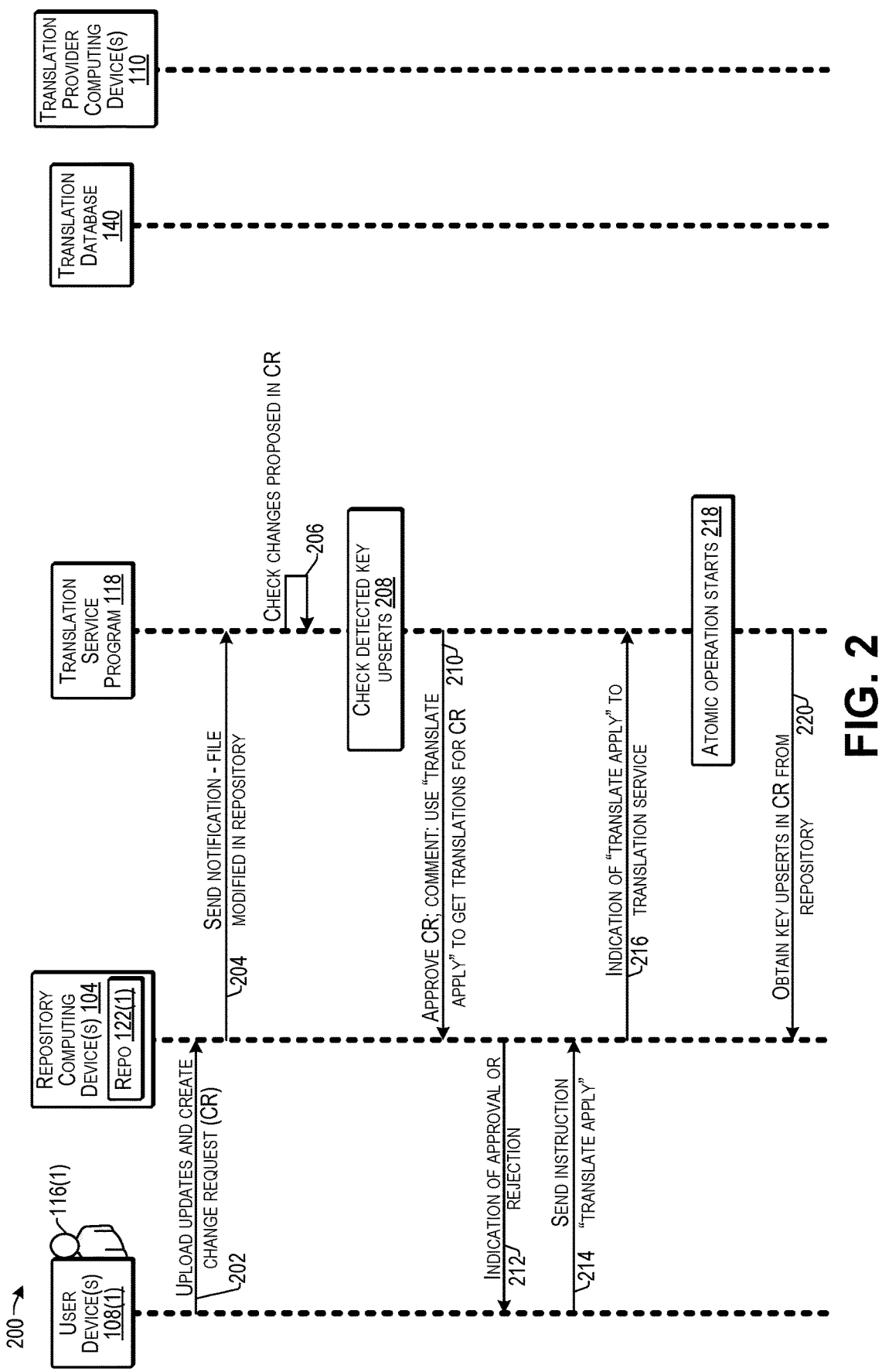
FIGS. 2-5 set forth a sequence diagram illustrating an example process for performing software translations on change requests according to some implementations.

The example of FIG. 2 includes the user device 108(1), the repository computing device(s) 104, the translation service program 118 executing on the service computing device(s) 102, the translation database 140, which may be maintained or otherwise accessed by the service computing device(s) 102, and the translation provider computing device(s) 110. Further, while the translation service program 118 is described as an actor herein, the actions described may be performed by one or more of the service computing devices 102 executing the translation service program 118 to perform the described actions.

At 202, the user device 108(1) may upload software updates and create a change request (CR) 128 at a repository 122, such as the repository 122(1) discussed above and associated with the repository computing device 104. For example, the change request 128 may be created for one or more modifications or other updates to a piece of software, such as the software updates 127 discussed above with respect to FIG. 1.

As described above, the software updates 127 may be generated by the user 116(1) uploaded from the user computing device 108(1) to the first repository 122(1) at the repository computing device 104. For instance, the user 116(1) may be a developer who makes a change to a piece of software such as adding a new key-to-string mapping to a source locale file (e.g., US English is used as the source locale in this example, although implementations herein are not limited to any particular source locale language), and also possibly includes some associated code changes. The user 116(1) uploads the software updates 127 and creates the change request 128 for having the software updates 127 accepted for updating the software. In some cases, the user 116(1) may first obtain the latest master version of the software to be updated and may create a local feature branch to receive the updates to the software. Following entry of the updates, the feature branch may be sent by the user device 108(1) to the repository, and the user 116(1) may create the change request 128 that summarizes the changes being made. The user 116(1) may also provide, with the change request 128, an indication of one or more target locales, in addition to the source locale, in which the software updates 127 are intended to be used.

At 204, the translation service program 118 may receive an indication from the repository computing device 104 indicating that a file has been modified in a repository at the repository computing device 104. For example, the translation service program 118 may receive a notification of the change request 128 from the repository computing device 104, such as via a registered webhook or through any other electronic notification technique. As one example, a webhook may be a service that is set up to cause the repository computing device 104 to send a notification (e.g., a callback) to the translation service program 118 whenever a specified event occurs, such as when a change is made to a repository at the repository computing device 104. Webhooks or a similar notification service may also enable the user computing device 108(1) to receive a notification whenever a change is made to a particular repository 122.

At 206, the translation service program 118 may be executed on the service computing device 102 to check the changes proposed in the change request. For instance, the translation service program may check the change request to ensure that the changes can be understood. As one example, the translation service program 118 may check to ensure that the file syntax is correct (e.g., a change request that makes changes to a JSON file may be checked to ensure that JSON syntax is followed).

At 208, for any new key-to-string mappings (key upserts) detected, the translation service program 118 may check to ensure that the keys are entered in the correct format and that there are no duplicate or conflicting keys. For instance, a "key upsert" may include a new key-to-string mapping or an update to an existing key-to-string mapping. The keys for each key-to-string mapping may be formatted according to a specified format to enable compatibility with the software that is the subject of the change request and compatibility with the localization files. In addition, the translation service program 118 may check to ensure that code portions (e.g., heredocs) defined by the translation service program 118 are used correctly in the change request.

At 210, if the key upserts have been entered in the correct format and the translation program is able to understand any other changes proposed to the software in the change request, the translation service program 118 may approve the change request. For example, the translation service program 118 may send an electronic communication to the repository computing device 104 indicating that the translation service program 118 has approved the change request 128. In some examples, the translation service program 118 may add an advisory comment that the change request 128 will result in a translation request being sent when the user sends a message, e.g., "translate apply". Alternatively, if the translation service program 118 detects a problem with the change request 128, instead of the approval, the translation service program 118 may send an indication of a rejection and an indication of a reason for the rejection of the change request 128 (not shown in FIG. 2).

At 212, the user may receive an indication of approval or rejection of the change request made by the translation service program 118. In some examples, the repository computing device 104 may send a notification of approval or rejection received at the repository 122(1) from the translation service program 118. In other examples, the user 116(1) may periodically check the repository 122(1) to determine whether approval or rejection has been received from the translation service program 118.

At 214, the user computing device may be caused to send, to the repository computing device 104, a message, e.g., a comment "translate apply" (or any other indication of affirmation that the translation service should proceed with obtaining one or more translations). For example, the user 116(1) may agree to the translation request and may perform an input to a user interface on the user computing device 108(1) to cause the user computing device 108(1) to send a message to the repository computing device 104 including the comment "translate apply". In response, the repository computing device 104 may associate the received message with the corresponding repository 122(1) that includes the change request 128. In some examples, such as in the case that the translation service program 118 initially rejects the proposed key upserts, the user may be able to submit a comment, such as "translate verify", that may cause the translation service program 118 to rerun its checks on the change request 128.

At 216, the translation service program 118 may receive an indication of the "translate apply" comment received from the user computing device 108(1). For instance, the translation service program 118 may receive an electronic notification, or other electronic communication indicating the "translate apply" comment from the user. As one example, the communication may be received via a webhook or similar techniques. Alternatively, the translation service program 118 may periodically check the repository 122(1) to determine whether the "translate apply" comment has been received from the user device 108(1).

At 218, based at least in part on receiving the indication of the "translate apply" comment in the repository 122(1), the translation service program 118 may initiate an atomic operation to obtain the translations for the key upserts. In this example, the atomic operation may be an operation that runs from start to finish, separated in time (e.g., mutually excluded) from all other "translate apply" operations that may be taking place for other change requests.

At 220, as part of the atomic operation initiated at 218, the translation service program 118 may obtain, from the repository 122(1) at the repository computing device 104, the key upserts for the change request 128.

Figure 3:
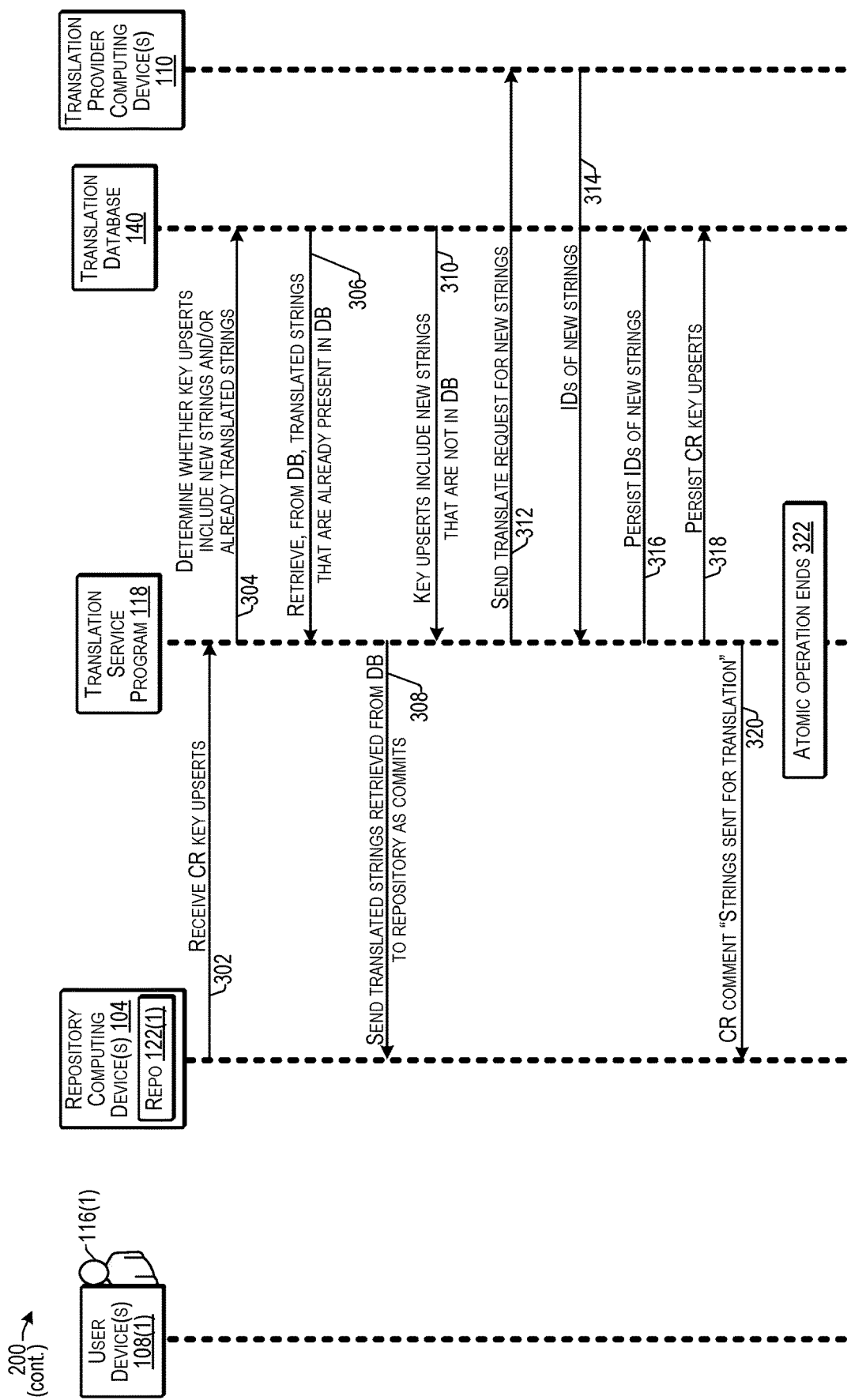

FIG. 3 is a sequence diagram illustrating a continuation of the process 200 according to some implementations.

At 302, as part of the atomic operation initiated at 218, the translation service program 118 may receive the key upserts in the change request from the repository 122(1).

At 304, the translation service program 118 may compare the received key upserts in the change request 128 with one or more database tables in the translation database 140. For example, the translation service program 118 may compare the received key upserts with the translations table 142 and the pending-provider-translations table 144 in the translation database 140 to determine whether the strings in the received key upserts are new strings, or have already been translated, or are in the process of being translated. For instance, the comparison may employ the source text and context of the respective strings for determining whether the strings are new strings. As one example, the comparison may include determining that the words in the received string match the words of the source text of the translated string, e.g., the same words in the same order, and may include a byte-by-byte comparison of the context of the matching strings. When a match is determined, the string already present in the translation database may be used instead of sending a request for translation of the received string. This ensures that requests for translation of the same string are not sent repeatedly to the translation provider.

At 306, the translation service program 118 may retrieve, from the translation database, the translated strings that are already present in the translation database 140. For example, if some strings have already been translated, these strings may be sent to the repository 122(1) immediately without having to wait for any new strings to be translated and returned by the translation provider computing device 110.

At 308, the translation service program 118 may send the already translated strings retrieved from the database to the repository computing device 104 for association with the repository 122(1). In some examples, the translation service program 118 may associate the translated strings with their respective key and may send the translated strings as a commit to the feature branch of the change request 128. Sending the already translated strings to the repository 122(1) when available, rather than waiting for translation of the new strings to be received enables the users to begin testing the software updates for various locales sooner, and can thereby shorten the development time for software updates.

At 310, the translation service program 118 may determine that the strings are new strings if the translation service program 118 cannot locate a matching string in the database.

At 312, if the translation service program 118 determines that the strings in the received key upserts are new strings that are not yet in the translation database, the translation service program 118 may send, to the translation provider computing device 110, the new strings and translate requests that identify the target locales for which translations are desired. On the other hand, if the strings are already included in the database, the translation service program 118 may skip to operation 318, and the atomic operation ends. In some examples, the translation service program 118 may send additional information with the new string(s) to be translated. For instance, for each new string, the translation service program 118 may send, to the translation provider computing device 110, a context of the string, the source text for the string, a source locale of the string, and one or more desired target locales for translation of the new strings.

At 314, the translation service program 118 may receive, from the translation provider computing device 110, identifiers of the new string(s) received by the translation provider computing device 110. For instance, the translation provider computing device 110 may return a unique or otherwise individually distinguishable string identifier (string ID) for each new string for which a translation has been requested.

At 316, the translation service program 118 may store the string IDs of the new strings in the translation database 140. For example, the string IDs for the new strings may be added to the pending provider translations table 144 with other information in the translation database 140. for instance, each entry in the pending-provider-translations table 144 may include the string ID, string context, source text, source locale, and a status indicator, such as "translation_in_ progress")

At 318, the translation service program 118 may also store the key upserts from the change request 128 in the translation database 140. For example, the key upserts may be stored in the pending change requests table 146 of the translation database 140. As one example, for each key and target locale for which translation was requested, the translation service program may create an entry in the pending change requests table 146 that includes key, context, source text, source locale, target locale, change request ID, and status, e.g., "translation_requested". For example, the information may be used by the translation service program 118 for later processing during a separate scheduled job.

At 320, the translation service program 118 may send a message to the repository computing device 104. For example, the translation service program 118 may send a change request comment indicating that the strings in the change request have been sent for translation. Accordingly, if the user 116(1) accesses the repository 122(1) to determine the status of the change request 128, the user 116(1) may view the comment indicating that one or more strings in the key upserts are in the process of being translated. Thus, the user 116(1) is notified of the outcome of the translate apply comment, and can expect to subsequently receive the translation(s) as one or more "commits" on a feature branch or other updated code associated with the change request.

At 322, following the sending of the comment to the repository 122(1), the translation service program 118 may end the atomic operation.

Figure 4:
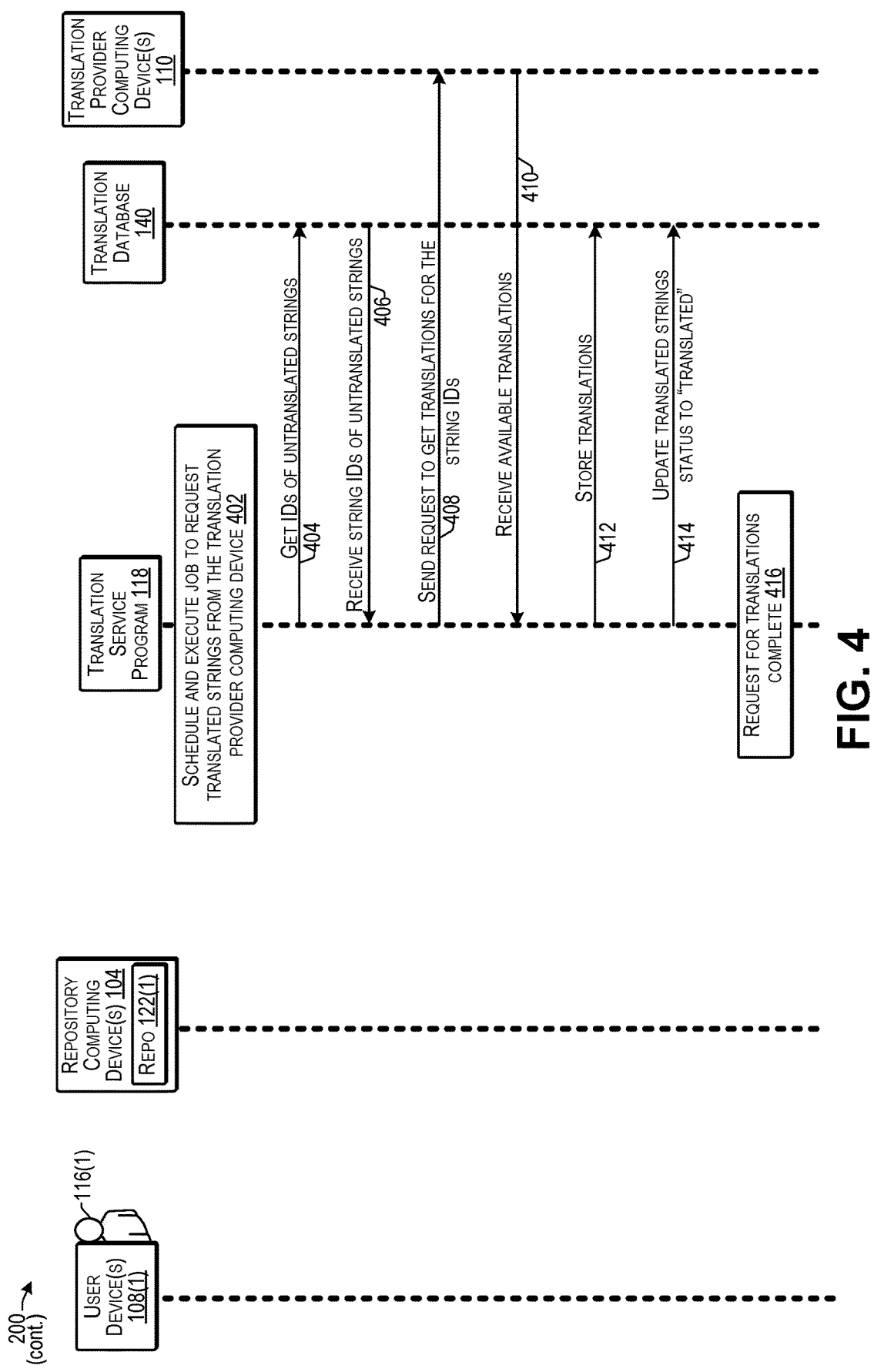

FIG. 4 is a sequence diagram illustrating a continuation of the process 200 according to some implementations.

At 402, the translation service program 118 may request translations from the translation provider computing device 110. As one example, the translation service program 118 may employ a job scheduler such as CRON, VIXIE-CRON, ANACRON DCRON, WINDOWS Task Scheduler, or the like, for requesting the translations. For instance, the translation service program 118 may schedule and execute a job, such as a CRON job, for fetching or otherwise requesting the translated string(s) from the translation provider computing device 110, such as based on the string IDs previously provided by the translation provider computing device 110. The frequency at which the job is scheduled and executed may be configurable by an administrator or other user, and may be, e.g., every minute, every 5 minutes, every 10 minutes, every 15 minutes, every half hour, every hour, or any other suitable time, depending on user preferences, system configuration, system capabilities, and the like. Additionally, or alternatively, the job may be scheduled based on other considerations, such as a number of translations pending, or the like, e.g., when more translations are pending, the job frequency may be increased.

At 404, the translation service program 118 may access the translation database 140 to obtain string IDs of all untranslated strings, e.g., strings whose status is indicated to be "translation in progress" in the pending provider translations table 144.

At 406, the translation service program 118 retrieves or otherwise receives the string IDs of the untranslated strings from the translation database 140.

At 408, the translation service program 118 sends, to the translation provider computing device 110, a request for the translations corresponding to the string IDs of the untranslated strings. As one example, the translation service program 118 may employ an API to request the translations for one or more string IDs received at 406 above. In some examples, the API may be a REST API or the like.

At 410, the translation service program 118 receives available translations from the translation provider computing device 110. For example, the translation provider computing device may compare the received string IDs with string IDs whose translations have been completed, and may send the completed translations to the translation service program 118 in response to the request from the translation service program 118. And in some examples, the translations may be sent via the API discussed above or through other suitable techniques. For example, each translated string may be sent along with an indication of the target locale to which the translated string applies.

At 412, the translation service program 118 may store the received translations in the translation database 140. For instance, the received translated strings may be stored to the translations table 142 in the translation database 140.

At 414, the translation service program 118 may update the status of the translated strings in the pending provider translations table 144 in the translation database 140. For instance, for each string ID for which a translation is received the translation service program 118 may change the status to "translation complete", or the like, so that the next time the scheduled job executes the corresponding string ID is not sent again to the translation provider computing device 110.

At 416, the translation service program completes the scheduled job, and may await a next trigger for repeating the job for requesting additional translations from the translation provider computing device 110.

Figure 5:
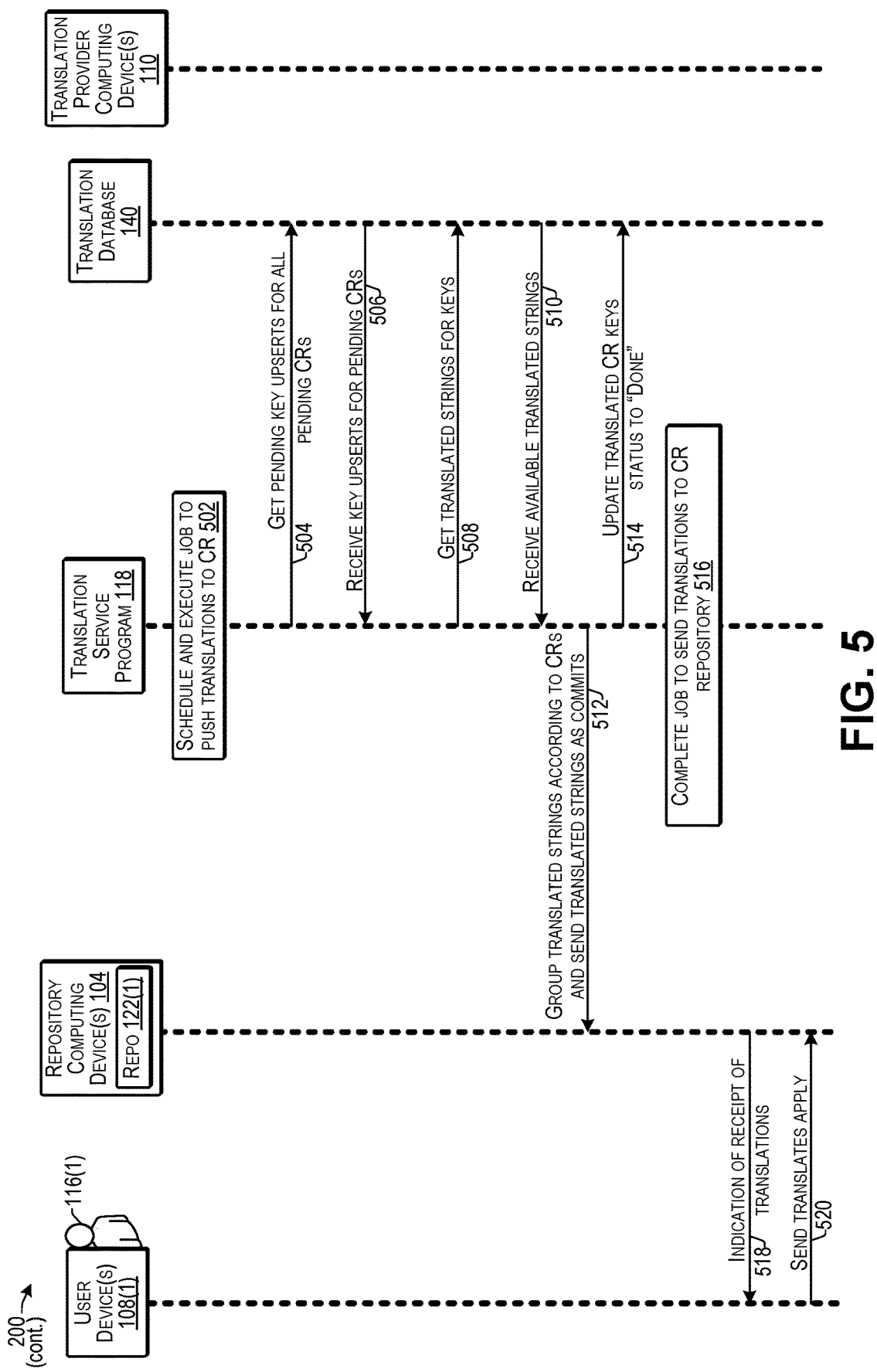

FIG. 5 is a sequence diagram illustrating a continuation of the process 200 according to some implementations.

At 502, the translation service program 118 schedules and executes a job to send the translations for the change request 128 to the repository 122(1). For instance, the translation service program 118 may schedule a CRON job, or the like, for delivering the translated strings to the repository 122(1) at the repository computing device 104.

At 504, the translation service program 118 accesses the translation database 140 to get pending key upserts for all pending change requests. For example, the translation service program 118 may access the pending change requests table 146 to determine all keys with the status "translation requested".

At 506, the translation service program 118 may receive, from the translation database 140, the key upserts for the pending change requests.

At 508, the translation service program 118 may access the translation database 140 to get the translated strings for the keys in the key upserts received at 506 above. For instance, depending on the number of locales targeted for translation there may be a plurality of different translated strings for each key, with each translated string corresponding to a different respective locale. The translation service program 118 may access the translations table 142 to retrieve the translated strings that are complete, e.g., the context, source text, source locale, and target locale columns match.

At 510, the translation service program 118 may receive, from the translation database 140, the available translated strings.

At 512, the translation service program 118 may group the translated strings according to their respective change requests and may associate the translated strings with their respective keys. The translation service program 118 may send the translated texts as a commit to the feature branch of the change request 128.

At 514, the translation service program 118 may update the status of the change request keys for which translated strings have been received to "done" in the pending change requests table 146 in the translation database 140 so that when the scheduled job is repeated, these keys are retrieved.

At 516, the translation service program 118 completes the scheduled job to send the translations to the change request repository 122(1). In some cases, the translated strings may arrive at the feature branch at the repository 122(1) through multiple separate commits based on when the respective translations are completed and/or based on whether the translation is already available in the translation database 140.

At 518, the user device 108(1) may receive an indication of receipt of translations at the repository 122(1). In some examples, the repository computing device 104 may send a notification of a translation received at the repository 122(1). In other examples, the user 116(1) may periodically check the repository 122(1) to determine whether all the translations have been received from the translation service program 118. In some examples, it is the responsibility of the user 116(1) to ensure all translations have been received in the repository 122(1) before the change request is merged to the master version of the software. Further, following receipt of the translations, the user 116(1) may perform testing of the software updates for each target locale specified for the software updates. Accordingly, in the case that translations for some locales are completed sooner than those for others, the software updates for some locales may be tested and merged sooner than those for other locales.

At 520, the user device may send an instruction to the repository computing device 104 to apply the translations and merge the content of the change request 128 with the software. For example, after making sure that all translations are available in the change request in the repository 122(1), the user may send an instruction that merges the change request with the software. In some examples, the user may first have to resolve any merge conflicts and both the source code language and the target locales before merging the change request, as, during the translation process, other developers may have merged other change requests independently of the change request 128.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
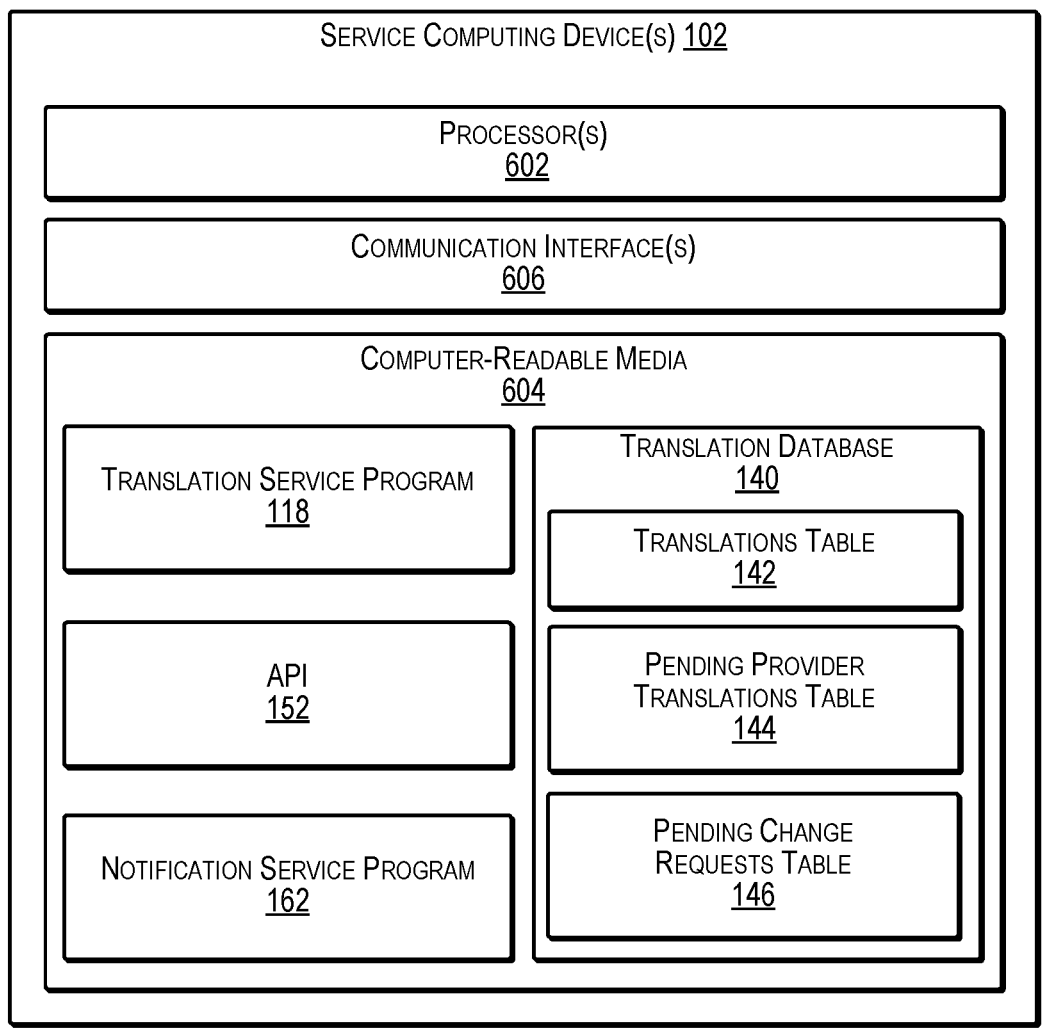
FIG. 6 illustrates select example components of a service computing device that may be used to implement at least some of the techniques and functions described herein.

FIG. 6 illustrates select example components of a service computing device 102 that may be used to implement at least some of the techniques and functions described herein. The service computing device 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device 102 includes, or may have associated therewith, one or more processors 602, one or more computer-readable media 604, and one or more communication interfaces 606. Each processor 602 may be a single processing unit or a number of processing units, and may include single or multiple computing units, or multiple processing cores. The processor(s) 602 can be implemented as one or more central processing units, microprocessors, microcomputers, microcontrollers, digital signal processors, state machines, logic circuitries, and/or any devices that manipulate signals based on operational instructions. As one example, the processor(s) 602 may include one or more hardware processors and/or logic circuits of any suitable type specifically programmed or configured to execute the algorithms and processes described herein. The processor(s) 602 may be configured to fetch and execute computer-readable instructions stored in the computer-readable media 604, which may program the processor(s) 602 to perform the functions described herein.

The computer-readable media 604 may include volatile and nonvolatile memory and/or removable and non-removable media implemented in any type of technology for storage of information, such as computer-readable instructions, data structures, program modules, or other data. For example, the computer-readable media 604 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 102, the computer-readable media 604 may be a tangible non-transitory medium to the extent that, when mentioned, non-transitory computer-readable media exclude media such as energy, carrier signals, electromagnetic waves, and/or signals per se. In some cases, the computer-readable media 604 may be at the same location as the service computing device 102, while in other examples, the computer-readable media 604 may be partially remote from the service computing device 102 such as at a network location accessed over the one or more networks 106.

The computer-readable media 604 may be used to store any number of functional components that are executable by the processor(s) 602. In many implementations, these functional components comprise instructions or programs that are executable by the processor(s) 602 and that, when executed, specifically program the processor(s) 602 to perform the actions attributed herein to the service computing device 102. Functional components stored in the computer-readable media 604 may include the translation service program 118 and the notification service program 162, as discussed above, each of which may include one or more computer programs, applications, modules, executable code, or portions thereof.

In addition, the computer-readable media 604 may store data, data structures, and other information used for performing the functions and services described herein. For example, the computer-readable media 604 may store the translation database 140, including the translations table 142, pending provider translations table 144, and pending change requests table 146. The computer-readable media may also store the API 152 for communication with the translation provider computing device(s) 110. The service computing device 102 may also include or maintain other functional components and data, which may include an operating system, programs, drivers, etc., and the data used or generated by the functional components. Further, the service computing device 102 may include many other logical, programmatic, and physical components, of which those described above are merely examples that are related to the discussion herein.

The one or more communication interfaces 606 may include one or more software and hardware components for enabling communication with various other devices, such as over the one or more network(s) 106. For example, the communication interface(s) 606 may enable communication through one or more of a LAN, WAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In addition, in some examples, repository computing device(s) 104, the translation provider computing devices 110, the user computing devices 108, the administrator computing device(s) 114, and/or the translator computing devices 112 may have hardware and software configurations similar to that of the service computing device(s) 102, but with different functional components as described above, e.g., with respect to FIG. 1.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors configured by executable instructions to perform operations including:
receiving, by the one or more processors, from a first computing device, at least one key-to-string mapping related to updated software located at a repository;
receiving, by the one or more processors, an indication of a target locale associated with the updated software;
comparing, by the one or more processors, a first string from the at least one key-to-string mapping with translated strings maintained in a database in association with the target locale to determine that a translated version of the first string for the target locale is absent from the database;
sending, by the one or more processors, via an application programming interface (API) and to a second computing device, the first string and the indication of the target locale, to cause at least in part, the second computing device to return a machine translation as a translated version of the first string that is based on the indication of the target locale;
receiving, by the one or more processors, and via the API, the translated version of the first string; and
sending, by the one or more processors, the translated version of the first string received via the API to the first computing device in association with the updated software located at the repository.

2. The system as recited in claim 1, wherein:
sending the translated version of the first string to the first computing device causes a notification to be provided to a user device able to communicate with the first computing device; and
based at least in part on the translated version of the first string being present at the repository, the first computing device receives, from the user device, an instruction to merge the updated software to a master software version.

3. The system as recited in claim 1, the operations further comprising:
determining, by the one or more processors, based on comparing a second string from the at least one key-to-string mapping with the translated strings maintained in the database, that a translated version of the second string translated for the target locale is present in the database;
and
sending, by the one or more processors, the translated version of the second string to the first computing device in association with the updated software.

4. The system as recited in claim 1, the operation of receiving, from the second computing device, the translated version of the first string further comprises:
receiving, from the second computing device, a string identifier (ID) for the first string;
storing the string ID in the database with an indicated untranslated status; and
sending, to the second computing device, a request to obtain a translation corresponding to the string ID.

5. The system as recited in claim 1, wherein the second computing device performs a machine translation of the first string based on the indication of the target locale, and sends, to the one or more processors, via the API, the translated version of the first string.

6. The system as recited in claim 1, the operations further comprising checking, by the one or more processors, a format of changes proposed in the change request to determine, at least in part, whether to approve or reject the change request.

7. A method comprising:
receiving, by one or more processors, from a first computing device, at least one key-to-string mapping related to updated software located at a repository;
receiving, by the one or more processors, an indication of a target locale associated with the updated software;
comparing, by the one or more processors, a first string from the at least one key-to-string mapping with translated strings maintained in a database in association with the target locale to determine that a translated version of the first string for the target locale is absent from the database;
sending, by the one or more processors, via an application programming interface (API) and to a second computing device, the first string and the indication of the target locale, to cause at least in part, the second computing device to return a machine translation as a translated version of the first string that is based on the indication of the target locale;
receiving, by the one or more processors, and via the API, the translated version of the first string; and
sending, by the one or more processors, the translated version of the first string received via the API to the first computing device in association with the updated software located at the repository.

8. The method as recited in claim 7, wherein:
sending the translated version of the first string to the first computing device causes a notification to be provided to a user device able to communicate with the first computing device; and
based at least in part on the translated version of the first string being present at the repository, the first computing device receives, from the user device, an instruction to merge the updated software to a master software version.

9. The method as recited in claim 7, further comprising:
determining, by the one or more processors, based on comparing a second string from the at least one key-to-string mapping with the translated strings maintained in the database, that a translated version of the second string translated for the target locale is present in the database;
and
sending, by the one or more processors, the translated version of the second string to the first computing device in association with the updated software.

10. The method as recited in claim 7, wherein receiving, from the second computing device, the translated version of the first string further comprises:
receiving, from the second computing device, a string identifier (ID) for the first string;
storing the string ID in the database with an indicated untranslated status; and
sending, to the second computing device, a request to obtain a translation corresponding to the string ID.

11. The method as recited in claim 7, wherein the second computing device performs a machine translation of the first string based on the indication of the target locale, and sends, to the one or more processors, via the API, the translated version of the first string.

12. The method as recited in claim 7, further comprising:
    sending, to the second computing device, a third string from the at least one key-to-string mapping and an indication of the target locale;
    receiving, from the second computing device, a notification sent from a translator device;
    forwarding the notification to a user computing device associated with the change request;
    receiving, from the first computing device, an updated key-to-string mapping including an updated third string updated based at least in part on the notification; and
    sending, to the second computing device, the updated third string for translation.

13. The method as recited in claim 7, further comprising checking, by the one or more processors, a format of changes proposed in the change request to determine, at least in part, whether to approve or reject the change request.

14. A non-transitory computer-readable medium storing instructions executable to configure one or more processors to perform operations comprising:
    receiving, from a first computing device, at least one key-to-string mapping related to updated software located at a repository;
    receiving, by the one or more processors, an indication of a target locale associated with the updated software;
    comparing, by the one or more processors, a first string from the at least one key-to-string mapping with translated strings maintained in a database in association with the target locale to determine that a translated version of the first string for the target locale is absent from in the database;
    sending, by the one or more processors, via an application programming interface (API) and to a second computing device, the first string and the indication of the target locale, to cause at least in part, the second computing device to return a machine translation as a translated version of the first string that is based on the indication of the target locale;
    receiving, by the one or more processors, and via the API, the translated version of the first string; and
    sending, by the one or more processors, the translated version of the first string received via the API to the first computing device in association with the updated software located at the repository.

15. The non-transitory computer-readable medium as recited in claim 14, wherein:
    sending the translated version of the first string to the first computing device causes a notification to be provided to a user device able to communicate with the first computing device; and
    based at least in part on the translated version of the first string being present at the repository, the first computing device receives, from the user device, an instruction to merge the updated software to a master software version.

16. The non-transitory computer-readable medium as recited in claim 14, the operations further comprising:
    determining, by the one or more processors, based on comparing a second string from the at least one key-to-string mapping with the translated strings maintained in the database, that a translated version of the second string translated for the target locale is present in the database;
    and
    sending, by the one or more processors, the translated version of the second string to the first computing device in association with the updated software.

17. The non-transitory computer-readable medium as recited in claim 14, wherein receiving, from the second computing device, the translated version of the first string further comprises:
    receiving, from the second computing device, a string identifier (ID) for the first string;
    storing the string ID in the database with an indicated untranslated status; and
    sending, to the second computing device, a request to obtain a translation corresponding to the string ID.

18. The non-transitory computer-readable medium as recited in claim 14, wherein the second computing device performs a machine translation of the first string based on the indication of the target locale, and sends, to the one or more processors, via the API, the translated version of the first string.

19. The non-transitory computer-readable medium as recited in claim 14, the operations further comprising:
    sending, to the second computing device, a third string from the at least one key-to-string mapping and an indication of the target locale;
    receiving, from the second computing device, a notification sent from a translator device;
    forwarding the notification to a user computing device associated with the change request;
    receiving, from the first computing device, an updated key-to-string mapping including an updated third string updated based at least in part on the notification; and
    sending, to the second computing device, the updated third string for translation.

20. The non-transitory computer-readable medium as recited in claim 14, the operations further comprising checking, by the one or more processors, a format of changes proposed in the change request to determine, at least in part, whether to approve or reject the change request.

* * * * *